(12) United States Patent
Chin et al.

(10) Patent No.: US 8,074,114 B2
(45) Date of Patent: Dec. 6, 2011

(54) MOTHERBOARD ERROR DETECTION SYSTEM

(75) Inventors: Chih-Jen Chin, Taipei (TW); Meng-Sen Chou, Taipei (TW); Ying-Fan Chiang, Taipei (TW); Chien-Chih Chang, Taipei (TW)

(73) Assignee: Inventec Corporation, Taipei (TW)

( * ) Notice: Subject to any disclaimer, the term of this patent is extended or adjusted under 35 U.S.C. 154(b) by 151 days.

(21) Appl. No.: 12/611,127

(22) Filed: Nov. 3, 2009

(65) Prior Publication Data

US 2011/0055631 A1  Mar. 3, 2011

(30) Foreign Application Priority Data

Sep. 2, 2009 (TW) ................................ 98129571 A

(51) Int. Cl.
*G06F 11/00* (2006.01)
(52) U.S. Cl. .................. 714/36; 714/57; 713/1; 713/2
(58) Field of Classification Search .................. 714/36, 714/57; 713/1, 2
See application file for complete search history.

(56) References Cited

U.S. PATENT DOCUMENTS

| | | | | |
|---|---|---|---|---|
| 5,471,674 A | * | 11/1995 | Stewart et al. ...................... | 713/2 |
| 6,100,088 A | * | 8/2000 | Ross et al. .................. | 435/320.1 |
| 6,393,586 B1 | * | 5/2002 | Sloan et al. ...................... | 714/25 |
| 6,745,343 B1 | * | 6/2004 | Barenys et al. .................. | 714/36 |
| 7,315,962 B2 | * | 1/2008 | Neuman et al. .................. | 714/36 |
| 7,376,537 B2 | * | 5/2008 | Delory, Jr. ...................... | 702/186 |
| 2004/0010773 A1 | * | 1/2004 | Chan et al. ...................... | 717/104 |
| 2007/0094538 A1 | * | 4/2007 | Kung et al. ...................... | 714/36 |

OTHER PUBLICATIONS

"Conventional PCI." by Wikipedia.org. accessed via internet on May 31, 2011.*
"POST card." by Wikipedia.org. accessed via internet on May 27, 2011.*

* cited by examiner

*Primary Examiner* — Philip Guyton
(74) *Attorney, Agent, or Firm* — CKC & Partners Co., Ltd.

(57) ABSTRACT

A motherboard error detection system includes a pluggable error detection board and a motherboard having a boot management chip. When the motherboard enters a device-driven status from a standby status, the boot management chip is used to manage power-on timings of different voltage sources; to collect a plurality of sets of status information; and to check whether the sets of status information and the power-on timings have errors. The pluggable error detection board includes an interpreting unit, a message-reading interface and a connector which is pluggably disposed on the motherboard. When the boot management chip notifies the pluggable error detection board to read an error message, the interpreting unit converts the error message to human-readable information, and the human-readable information is outputted through the message-reading interface.

7 Claims, 3 Drawing Sheets

FIG. 2A

| Write Mode | | | | |
|---|---|---|---|---|
| Preamble Field | Operation Mode Field | Register Address Field | System Address Field | Data Valid Field |

| Read Mode | | | | | |
|---|---|---|---|---|---|
| Preamble Field | Operation Mode Field | Register Address Field | System Address Field | Acknowledge Field | Data Valid Field |

410 — 420 — 430 — 440 — 460 — 450

400'

MOTHERBOARD ERROR DETECTION SYSTEM

RELATED APPLICATIONS

This application claims priority to Taiwan Application Serial Number 98129571, filed Sep. 2, 2009, which is herein incorporated by reference.

BACKGROUND

1. Field of Invention

The present invention relates to a circuit board error detection apparatus. More particularly, the present invention relates to a motherboard error detection system.

2. Description of Related Art

The current electronic products all are equipped with motherboards. Each of the motherboards is composed of electronic elements and a circuit board. The electronic elements are mounted on the circuit board, and are electrically connected to each other via internal wiring of the circuit board. During the production of electronic products, tests are conducted on the motherboards of the electronic products, and the motherboards passing the tests are used for subsequent processes, thereby preventing process errors form being accumulated, thus promoting the overall process yield.

Herein, a motherboard applied in a computer is used as an example for explanation. In order to test a power-supplying status of the motherboard, a plurality of LEDs (Light Emitting Diodes; such as 15-20 LEDs) specifically used for a hardware test are generally disposed on the motherboard. When the computer is booted and conducts the hardware test, the on or off of the LEDs will be used to indicate whether a power source is activated normally, thus benefiting subsequent test procedures to be conducted smoothly.

However, the LEDs occupy a certain proportion of overall cost, including stocking cost, material cost, assembling and soldering cost, test cost and manpower cost. The LEDs are distributed on the motherboard and also occupy quite a lot of space of the motherboard, thus increasing the complexity of circuit layout, and meanwhile consuming a lot of test time on a production line.

Hence, it is an urgent topic for those who are in this field to develop a motherboard error detection system for smoothly performing a start-up hardware test without needing to use the LEDs for the hardware test, thereby preventing the aforementioned inconvenience and disturbance.

SUMMARY

In view of this, an aspect of the present invention is to provide a motherboard error detection system and its pluggable error detection board for using motherboard error messages provided by a boot management chip disposed on a motherboard to enable a testing person to truly find out the elements and locations having errors on the motherboard, so that the testing person does not need to conduct a large scale of testing on the motherboard by using a debugging method, thus reducing the testing time and manpower.

Another aspect of the present invention is to omit the disposition of LEDs used for test by using a pluggable error detection board externally connected to a boot management chip, thereby greatly reducing the quantity and cost of the LEDs, the circuit layout complexity due to the existence of the LEDs, and the space occupied by the LEDs. Further, the pins of the boot management chip is no longer required to be used for controlling the LEDs, and can be saved or used for other purposes, thus lowering the hardware cost.

In one embodiment, the motherboard error detection system includes a pluggable error detection board and a motherboard. The motherboard has a boot management chip. When the motherboard undergoes a standby status, a boot status, a BIOS (Basic Input/Output System) check status and a device-driven status, the boot management chip manages power-on timings of a plurality of different voltage sources in accordance with a power sequence, and periodically collects a plurality of sets of system status information of the motherboard, and checks whether the sets of system status information and the power-on timings of the voltage sources have errors. The pluggable error detection board includes an interpreting unit, a connector and a message-reading interface. The connector is pluggably disposed on the motherboard. When the connector is plugged into the motherboard, an electrical connection is established between the interpreting unit and the boot management chip. The message-reading interface is electrically connected to the interpreting unit, wherein, when finding errors, the boot management chip notifies the pluggable error detection board to read an error message from the boot management chip, and the interpreting unit converts the error message to human-readable information, and the human-readable information is outputted through the message-reading interface.

In another embodiment, the boot management chip is an I/O controller or a complex programmable logic device (CPLD).

In another embodiment, the motherboard error detection system further includes a comparison table module disposed on the pluggable error detection board and electrically connected to the interpreting unit, wherein the comparison table module has a plurality of sets of reference human-readable information provided for the interpreting unit to compare the error message therewith so as to obtain the human-readable information.

In another embodiment, the boot management chip includes a power pin, an analyzer enable pin, a MD mode pin, a management data clock pin and a management data input/output (I/O) pin. The management data clock pin provides a specific frequency. The management data I/O pin provides the pluggable error detection board with a channel of transmitting the error message. The power pin supplies power to the pluggable error detection board. The analyzer enable pin detects whether the pluggable error detection board is electrically connected to the motherboard. The MD mode pin uses a change of high-level status or low-level status to provide the pluggable error detection board with a message regarding whether the error message is available.

In the embodiments, a communication protocol is followed between the boot management chip and the interpreting unit. The communication protocol includes a write mode and a read mode. Under the write mode, the communication protocol has a preamble field, an operation mode field, a register address field, a system address field, and a data valid field, wherein the operation mode field is used to list a reference number representing the write mode or the read mode. Under the read mode, the communication protocol, has the preamble field, the operation mode field, the register address field, the system address field, the data valid field and an acknowledge field, wherein the acknowledge field is used to list data of notifying the interpreting unit to read the error message.

In another embodiment, the motherboard error detection system further includes an expert system module. The expert system module is disposed in a computer apparatus which is removably electrically connected to the interpreting unit, wherein the interpreting unit transmits the human-readable information to the expert system module.

Another aspect of the present invention is to provide a pluggable error detection board of a motherboard. The pluggable error detection board is suitable for use in reading an error message found by a boot management chip of a motherboard. When the motherboard enters a device-driven status from a standby status, the boot management chip manages power-on timings of a plurality of different voltage sources in accordance with a power sequence, and periodically collects a plurality of sets of system status information of the motherboard, and checks whether the sets of system status information and the power-on timings of the voltage sources have errors.

The pluggable error detection board includes a connector, a message-reading interface and an interpreting unit. The connector is pluggably disposed on the motherboard. The interpreting unit is electrically connected to the message-reading interface, and is electrically connected to the boot management chip when the connector is installed on the motherboard, wherein, when finding that the sets of system status information and the power-on timings of the voltage sources have errors; the boot management chip notifies the pluggable error detection board to read an error message from the boot management chip, and the interpreting unit converts the error message to human-readable information, and the human-readable information is outputted through the message-reading interface.

In sum, firstly, the embodiments of the present invention can truly find out the elements and locations having errors at the motherboard and do not need to conduct a large scale of testing on the motherboard, thus reducing the testing time and manpower. Secondly, the embodiments of the present invention can omit the disposition of LEDs used for test by using a pluggable error detection board externally connected to a boot management chip, thereby greatly reducing the quantity and cost of the LEDs, the circuit layout complexity due to the existence of the LEDs, and the space occupied by the LEDs.

It is to be understood that both the foregoing general description and the following detailed description are examples, and are intended to provide further explanation of the invention as claimed.

BRIEF DESCRIPTION OF THE DRAWINGS

These and other features, aspects, and advantages of the present invention will become better understood with regard to the following description, appended claims, and accompanying drawings where:

FIG. 2A is a schematic diagram showing a packet field format of a communication protocol under a write mode according to another embodiment of the present invention;

FIG. 2B is a schematic diagram showing a packet field format of a communication protocol under a read mode according to another embodiment of the present invention.

DESCRIPTION OF THE PREFERRED EMBODIMENTS

Figure 1:
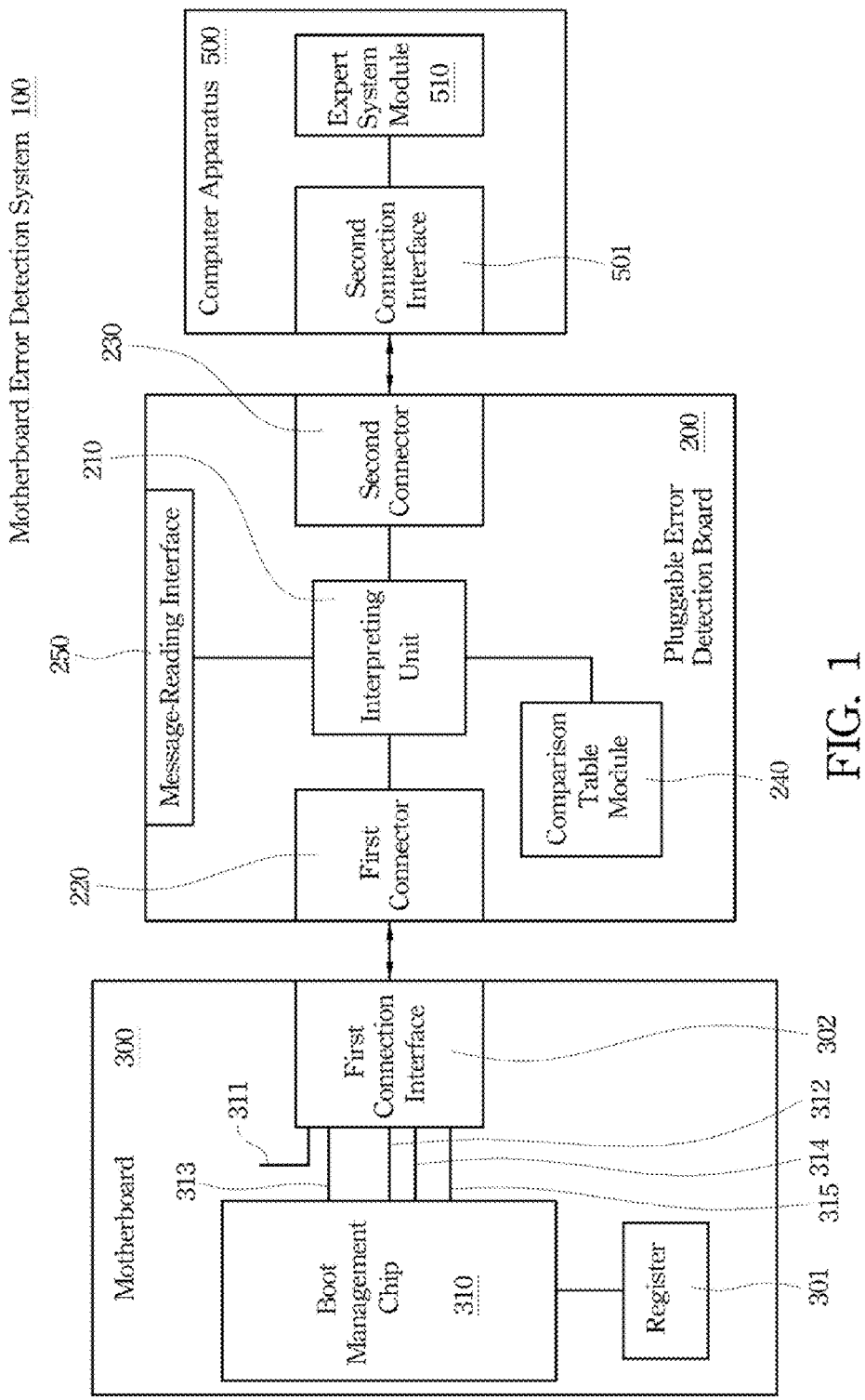
FIG. 1 is a functional block diagram showing a motherboard error detection system according to an embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

Referring to FIG. 1, FIG. 1 is a functional block diagram showing a motherboard error detection system according to an embodiment of the present invention. This embodiment discloses a motherboard error detection system 100 including a pluggable error detection board 200 and a motherboard 300.

In one embodiment, the motherboard 300, such as a computer motherboard, has a boot management chip 310 (such as an I/O controller or a CPLD) installed thereon. When the motherboard 300 undergoes a standby status, a boot status, a BIOS check status and a device-driven status, the boot management chip 310 is mainly used to (1) manage power-on timings of a plurality of different voltage sources in accordance with a power sequence; (2) periodically collect a plurality of sets of system status information of the motherboard under the aforementioned respective statuses; and (3) check whether the sets of system status information and the power-on timings of the voltage sources have errors, and when finding errors, the boot management chip 310 generates an error message and stores it into a register 301 provided for the pluggable error detection board 200 to read out, wherein the error message, such as hexadecimal data, cannot be recognized by human.

It is noted that the so-called "standby status" means that the motherboard 300 has been supplied with a standby power source (for example, a plug of a computer apparatus 500 in which the motherboard 300 is installed is inserted into a household power socket), but a boot procedure is not started since an activation button of the computer apparatus 500 has not yet been pressed. The so-called "boot status" means that the activation button of the computer apparatus 500 (motherboard 300) has been pressed, and the boot procedure is being performed. The so-called "BIOS check status" means that the motherboard 300 has entered a BIOS checking step. The so-called "device-driven status" means that the motherboard 300 has completed the BIOS checking step, and the devices (such as a hard disk, an interface card, etc.) detected by the motherboard 300 have been activated one after another, which is referred to as system boot completion.

The pluggable error detection board 200 is removably connected to the motherboard 300, and includes an interpreting unit 210 (such as a micro-controller unit (MCU)), a first connector 220, a second connector 230, a comparison table module 240 and a message-reading interface 250 (such as a display screen). The first connector 220 is pluggably connected to a first connection interface 302 (such as a 1×6 pin connector). The interpreting unit 210 is electrically connected to the first connector 220, the second connector 240, the register 301, the comparison table module 240 and the message-reading interface 250 respectively. When the first connector 220 is plugged into the first connection interface 302, an electrical connection is established between the interpreting unit 210 and the boot management chip 310 for information communication. The interpreting unit 210 is in charge of reading the aforementioned error message from the register 301 of the boot management chip 310, and returning the error message back to the pluggable error detection board 200 via the first connector 220. Further, the comparison table module 240 has a plurality of sets of reference human-readable information provided for the interpreting unit 210 to compare the error message therewith so as to convert the error message to human-readable information provided for human reading.

In this embodiment, when generating the error message, the boot management chip 310 may inform the interpreting unit 210 of the errors currently found, and notify the interpreting unit 210 to read the error message from the register 301.

As shown in FIG. 2A and FIG. 2B, FIG. 2A and FIG. 2B are schematic diagrams showing respective packet field formats of a communication protocol under a write mode and a read mode according to another embodiment of the present invention. For avoiding conflicts, a communication protocol is followed between the boot management chip 310 and the interpreting unit 210, and provides different packet field formats 400 and 400' under a write mode and a read mode. For example, the packet field format 400 under the write mode has a preamble field 410, an operation mode field 420, a register address field 430, a system address field 440, and a data valid field 450, wherein the operation mode field 420 is used to list a reference number, for example, "0" for representing the write mode; or "1" for representing the read mode. The register address field 430 is used to list a reference number, for example "000" for representing the boot status or "001" for representing the BIOS check status.

For example, the packet field format 400' under the read mode has the preamble field 410, the operation mode field 420, the register address field 430, the system address field 440, an acknowledge field 460 and the data valid field 450, wherein the functions and formats of the operation mode field 420 and the register address field 430 have been described above, and the data listed in the acknowledge field is the base used to notify the interpreting unit to read the error message.

Please refer to FIG. 1 again. In this embodiment, the aforementioned boot management chip 310 includes a power pin 311, an analyzer enable pin 312, a MD mode pin 313, a management data clock pin 314 and a management I/O pin 315. These pins are respectively extended to the first connection interface 302, and the voltage changes on the pins are used to achieve the presentation of the aforementioned communication protocol. The power pin 311 is used to supply the required power to the pluggable error detection board 200. The analyzer enable pin 312 is used to detect whether the first connector 220 of the pluggable error detection board 200 is electrically connected to the first connection interface 302. The MD mode pin 313 is used to provide the pluggable error detection board 200 with a message regarding whether the error message is available, by using a change of high-level status or low-level status. The management data clock pin 314 is used to provide a specific frequency (such as 32-400K). The management data I/O pin 315 is used to provide a channel of transmitting data (such as the error message).

Further, as shown in FIG. 1, the motherboard error detection system 100 includes an expert system module 510. The expert system module 510 is generally disposed in a computer apparatus 500 (such as a notebook computer or personal computer), and a second connection interface 501 (such as a USB interface) of the computer apparatus 500 is removably electrically connected to the second connector 230. When the second connector 230 is plugged into the second connection interface 501, the interpreting unit 210 is electrically connected to the expert system module 510 for data communication, and the computer apparatus 500 supplies proper power to the pluggable error detection board 200.

When the human-readable information is not directly read by people via the message-reading interface 500, the interpreting unit 210 may transmit the human-readable information to the expert system module 510 via the second connector 230, and then the expert system module 510 may provide actual error positions to the motherboard 300 in accordance with the human-readable information. Further, the computer apparatus 500 also may update the data in the comparison table module 240 via the second connector 230.

Figure 3:
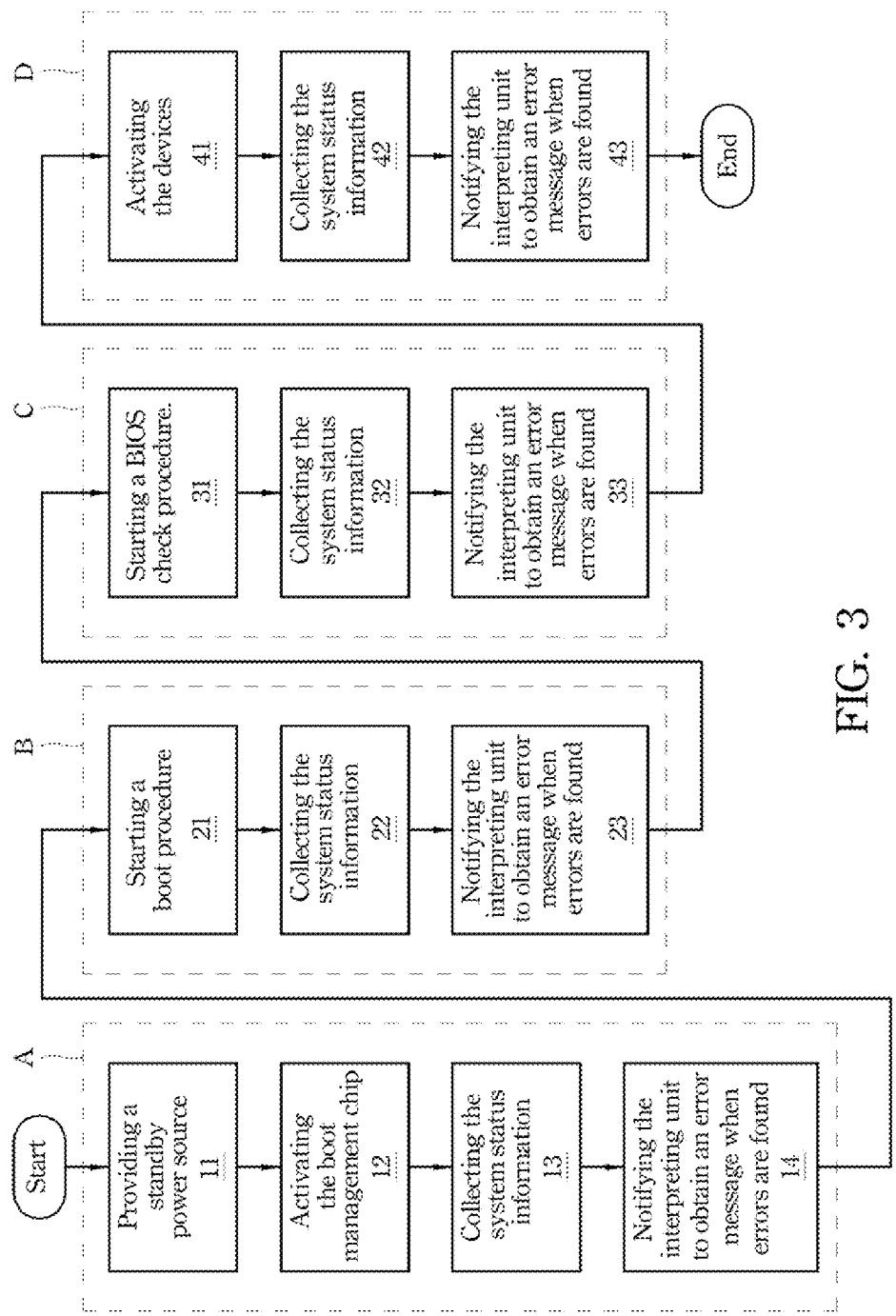
FIG. 3 is a flow chart showing the operation of the motherboard error detection system according to the embodiment of the present invention.

As shown in FIG. 1 and FIG. 3, FIG. 3 is a flow chart showing the operation of the motherboard error detection system according to the embodiment of the present invention. When the first connector 220 of the pluggable error detection board 200 is connected to the first connection interface 302 of the motherboard 300, the motherboard 300 performs the following steps.

Standby Status A

At first, the motherboard 300 enters the standby status A. Under the standby status A, step 11 is performed to provide a standby power source. In step 11, when the motherboard 300 has been supplied with a standby power source (for example, a plug of a computer apparatus 500 in which the motherboard 300 is installed is inserted into a household power socket), a boot procedure is not started since an activation button of the computer apparatus 500 has not yet been pressed.

Then, step 12 is performed to activate the aforementioned boot management chip 310. In step 12, the motherboard 300 uses the standby power source to activate the boot management chip 310, and the boot management chip 310 manages power-on timings of a plurality of different voltage sources in accordance with a power sequence.

Meanwhile, the boot management chip 310 supplies required power to the pluggable error detection board 200 via the power pin 311, and to detect whether the pluggable error detection board 200 is electrically connected to the motherboard 300 via the analyzer enable pin 312.

Thereafter, step 13 is performed to collect the system status information. In step 13, the boot management chip 310 starts collecting the system status information, and stores the system status information into the register 301, and meanwhile checks whether the system status information and the power-on timings of the voltage sources have errors. If the result is yes, step 14 is performed; otherwise, step 13 is ended.

Step 14 is performed to notify the interpreting unit 210 to obtain an error message when errors are found. When finding errors, the boot management chip 310 issues a failure signal to inform the pluggable error detection board 200 that the error message is available (ready to be read) by using the high-level status of the MD mode pin 313. Thus, the error message can be transmitted back to the pluggable error detection board 200 via the management I/O pin 315, thereby performing the aforementioned interpreting process.

After the pluggable error detection board 200 finishes returning the error message, the boot management chip 310 returns the MD mode pin 313 back to the low-level status.

Boot Status B

Thereafter, the motherboard 300 enters the boot status B. Under the boot status B, step 21 is preformed to start a boot procedure. In step 21, after the activation button of the motherboard 300 is pressed, the motherboard 300 performs the boot procedure, and meanwhile, more power is supplied to the motherboard 300 for performing a common boot procedure.

Then, step 22 is performed to collect the system status information. In step 22, the boot management chip 310 starts collecting the system status information, and stores the system status information into the register 301, and meanwhile checks whether the system status information and the power-on timings of the voltage sources have errors. If the result is yes, step 23 is performed; otherwise, step 22 is ended.

Step 23 is performed to notify the interpreting unit 210 to obtain an error message when errors are found. When finding errors, the boot management chip 310 issues a failure signal to inform the pluggable error detection board 200 that the error message is available (ready to be read) by using the high-level status of the MD mode pin 313. Thus, the error message can be transmitted back to the pluggable error detection board 200 via the management I/O pin 315, thereby performing the aforementioned interpreting process.

After the pluggable error detection board 200 finishes returning the error message, the boot management chip 310 returns the MD mode pin 313 back to the low-level status.

BIOS Check Status C

Thereafter, the motherboard 300 enters the BIOS check status C. Under the BIOS check status C, step 31 is preformed to start a BIOS check procedure. In step 31, the motherboard 300 reads a BIOS program for performing a common POST (Power On Self Test) check.

Then, step 32 is performed to collect the system status information. In step 32, the boot management chip 310 starts collecting the system status information, and stores the system status information into the register 301, and meanwhile checks whether the system status information and the power-on timings of the voltage sources have errors. If the result is yes, step 33 is performed; otherwise, step 32 is ended.

Step 33 is performed to notify the interpreting unit 210 to obtain an error message when errors are found. When finding errors, the boot management chip 310 issues a failure signal to inform the pluggable error detection board 200 that the error message is available (ready to be read) by using the high-level status of the MD mode pin 313. Thus, the error message can be transmitted back to the pluggable error detection board 200 via the management I/O pin 315, thereby performing the aforementioned interpreting process.

After the pluggable error detection board 200 finishes returning the error message, the boot management chip 310 returns the MD mode pin 313 back to the low-level status.

Device-driven Status D

Thereafter, the motherboard 300 enters the device-driven status D. Under the device-driven status D, step 41 is preformed to activate the devices detected by the motherboard 300. In step 41, when detecting the completion of BIOS check, the devices (such as a hard disk, an interface card, etc.) detected by the motherboard 300 are activated one after another.

Then, step 42 is performed to collect the system status information. In step 42, the boot management chip 310 starts collecting the system status information, and stores the system status information into the register 301, and meanwhile checks whether the system status information and the power-on timings of the voltage sources have errors. If the result is yes, step 43 is performed; otherwise, step 42 is ended.

Step 43 is performed to notify the interpreting unit 210 to obtain an error message when errors are found. When finding errors, the boot management chip 310 issues a failure signal to inform the pluggable error detection board 200 that the error message is available (ready to be read) by using the high-level status of the MD mode pin 313. Thus, the error message can be transmitted back to the pluggable error detection board 200 via the management I/O pin 315, thereby performing the aforementioned interpreting process.

To sum up, firstly, the embodiments of the present invention can truly find out the elements and locations having errors at the motherboard 300 and do not need to conduct a large scale of testing on the motherboard 300, thus reducing the testing time and manpower. Secondly, the embodiments of the present invention can omit the disposition of LEDs used for test by using a pluggable error detection board externally connected to a boot management chip, thereby greatly reducing the quantity and cost of the LEDs, the circuit layout complexity due to the existence of the LEDs, and the space occupied by the LEDs. Further, the pins of the boot management chip 310 is no longer required to be used for controlling the LEDs, and can be saved or used for other purposes, thus lowering the hardware cost.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A motherboard error detection system, comprising:
a motherboard having a boot management chip, wherein, when the motherboard undergoes a standby status, a boot status, a BIOS (Basic Input/Output System) check status and a device-driven status, the boot management chip manages power-on timings of a plurality of voltage sources in accordance with a power sequence, and periodically collects a plurality of sets of system status information of the motherboard, and checks whether the sets of system status information and the power-on timings of the voltage sources have errors, wherein the boot management chip comprises:
a power pin used to supply power;
an analyzer enable pin; and
a MD mode pin using a change of high-level status or low-level status to provide a message regarding whether an error message is available; and
a pluggable error detection board, comprising:
an interpreting unit;
a connector pluggably disposed on the motherboard, wherein, when the connector is plugged into the motherboard, an electrical connection is established between the interpreting unit and the boot management chip, and the connector being connected to the power pin for receiving supplied power, and being connected to the analyzer enable pin for detected whether the pluggable error detection board is electrically connected to the motherboard, and being connected to the MD mode pin for receiving the message; and
a message-reading interface electrically connected to the interpreting unit;
wherein, when finding errors, the boot management chip notifies the pluggable error detection board to read the error message from the boot management chip, and the interpreting unit converts the error message to human-readable information, and the human-readable information is outputted through the message-reading interface.

2. The motherboard error detection system as claimed in claim 1, wherein the pluggable error detection board comprises a comparison table module electrically connected to the interpreting unit, the comparison table module having a plurality of sets of reference human-readable information provided for the interpreting unit to compare the error message therewith so as to obtain the human-readable information.

3. The motherboard error detection system as claimed in claim 1, wherein the boot management chip comprises:
a management data clock pin connected to the connector and providing a specific frequency; and
a management data input/output (I/O) pin connected to the connector and providing the pluggable error detection board with a channel of transmitting the error message.

4. The motherboard error detection system as claimed in claim 1, wherein a communication protocol is followed between the boot management chip and the interpreting unit.

5. The motherboard error detection system as claimed in claim 4, wherein the communication protocol comprises a write mode and a read mode;
- the communication protocol, under the write mode, having a preamble field, an operation mode field, a register address field, a system address field, and a data valid field, wherein the operation mode field is used to list a reference number representing the write mode or the read mode;
- the communication protocol, under the read mode, having the preamble field, the operation mode field, the register address field, the system address field, an acknowledge field and the data valid field, wherein the acknowledge field is used to list data of notifying the interpreting unit to read the error message.

6. The motherboard error detection system as claimed in claim 1, further comprising:
- an expert system module disposed in a computer apparatus which is removably electrically connected to the interpreting unit, wherein the interpreting unit transmits the human-readable information to the expert system module.

7. The motherboard error detection system as claimed in claim 1, wherein the boot management chip is an I/O controller or a complex programmable logic device (CPLD).

* * * * *